United States Patent
Foust (10) Patent No.: US 6,345,850 B1
(45) Date of Patent: Feb. 12, 2002

(54) VACUUM LIFTER

(75) Inventor: John W. Foust, Nampa, ID (US)

(73) Assignee: Micron Electronics, Inc., Nampa, ID (US)

(*) Notice: Subject to any disclaimer, the term of this patent is extended or adjusted under 35 U.S.C. 154(b) by 0 days.

(21) Appl. No.: 08/994,498

(22) Filed: Dec. 19, 1997

(51) Int. Cl.$^7$ .................................................. B66C 1/02
(52) U.S. Cl. ....................................... 294/64.1; 414/627
(58) Field of Search ...................... 294/64.1, 65, 65.5; 414/737, 627, 752; 901/40; 271/94, 95

(56) References Cited

U.S. PATENT DOCUMENTS

| | | | | |
|---|---|---|---|---|
| 3,858,926 A | * | 1/1975 | Ottenhues | 294/65 |
| 4,822,236 A | * | 4/1989 | Inoue et al. | 414/627 |
| 4,846,625 A | * | 7/1989 | Gabillet | 414/752 |
| 5,330,314 A | * | 7/1994 | Bennison | 294/64.1 |
| 5,478,066 A | * | 12/1995 | Yoshida et al. | 271/94 |
| 5,645,274 A | * | 7/1997 | Ubayashi et al. | 271/94 |

FOREIGN PATENT DOCUMENTS

| | | | | |
|---|---|---|---|---|
| DE | 4229208 | * | 3/1994 | 294/64.1 |
| SU | 1049405 | * | 10/1983 | 294/64.1 |
| SU | 1058865 | * | 12/1983 | 294/64.1 |
| SU | 1364592 | * | 1/1988 | 291/64.1 |

OTHER PUBLICATIONS

Product Bulletin *VT Series Vacuum Lift System* (Anver Corporation) Date Unknown, 3 pages.

* cited by examiner

*Primary Examiner*—Dean J. Kramer
*Assistant Examiner*—Paul T. Chin
(74) *Attorney, Agent, or Firm*—Trop, Pruner, Hu & Miles, P.C.

(57) ABSTRACT

A vacuum lifter is disclosed. The vacuum lifter includes an overhead hose, a housing, and a roller rotatably fixed to the housing. The housing is adapted to roll on the roller. In one embodiment the vacuum lifter also includes a sealing plate with a pliable sealing ring. The vacuum lifter can be used to lift, move, and deposit various objects from one place to another.

22 Claims, 9 Drawing Sheets

VACUUM LIFTER

BACKGROUND OF THE INVENTION

1. Field of the Invention

This invention relates generally to an apparatus for lifting objects and, more particularly, a vacuum lifter.

2. Description of the Related Art

Figure 1:
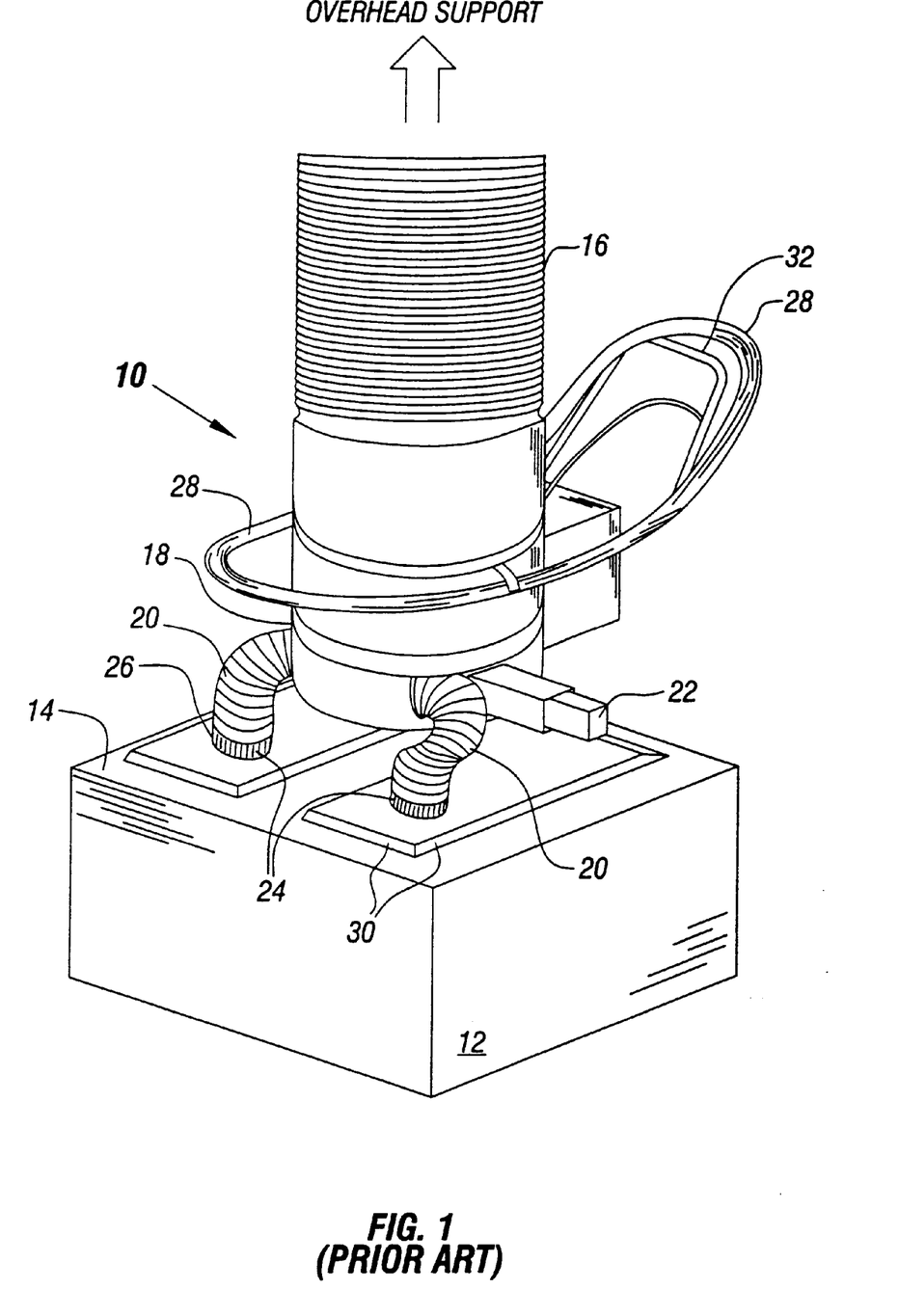
FIG. 1 illustrates a prior art vacuum lifter for raising and moving heavy or bulky objects.

FIG. 1 illustrates a prior art vacuum lifter 10 for lifting and transporting an object 12. The object 12 may take any form as long as at least one surface 14 is smooth and firmly fixed to the object 12. The vacuum lifter 10 includes an overhead vacuum hose 16 that is airtight. The overhead hose 16 has a substantially vertical portion terminating in a first end hermetically connected to the intake of a vacuum pump (not shown). A second end of the overhead hose 16 hermetically connects to a metal housing 18. The hose 16 is supported by an overhead structure (not shown) that supports the weight of both the lifter 10 and, when lifted, the object 12. In some cases, the overhead structure includes rollers and tracks (not shown) that facilitate horizontal displacements of the loaded lifter 10.

The housing 18 has airtight internal passages (not shown) that connect the overhead hose 16 to one or more secondary hoses 20. The housing 18 also has a support structure 22 fixedly connecting one or more sealing plates 24 to the bottom thereof. Each secondary hose 20 hermetically connects to an upper surface of the sealing plate 24 and connects with a lower surface thereof through one or more holes 26 that pierce the sealing plate. A pliable sealing ring 30 attaches to the entire perimeter of the lower surface of each sealing plate 24. The sealing ring 30 hermetically seals the lower surface of the sealing plate 24 to the top surface 14 of the object 12 upon compression therebetween.

One or more handles 28 project from the housing 18. A control lever 32 projecting from the housing 18 operates internal valves (not shown) which regulate the vacuum pressure in the secondary hoses 20. The vacuum lifter 10 forms a sealed conduit between the intake of the vacuum pump (not shown) and the surface 14 of the object 12 when a vacuum is created therein.

Figure 2A:
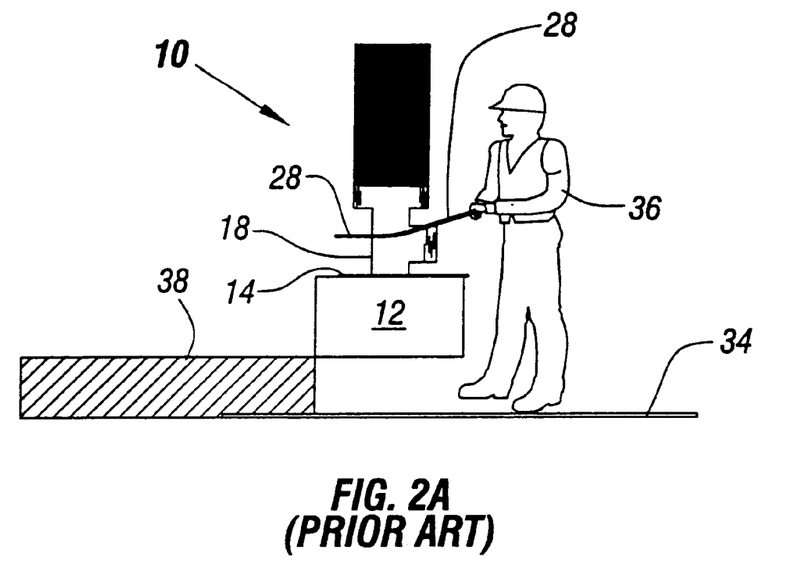
FIGS. 2A–2B illustrate the operation of the prior art lifter of FIG. 1.

FIG. 2A illustrates the operation of the vacuum lifter 10. The vacuum lifter 10 is positioned so that the sealing plate 24 is snug against the smooth surface 14 of the object 12. A vacuum is produced between the surface 14 and the sealing plates 24 by means of the secondary hoses 20. The vacuum forms a suction that grips the object 12 to the lifter 10. Since the conduit formed by the overhead hose 16 between the sealing plates 24 and the vacuum pump (not shown) is hermetically sealed, the vertical portion of the overhead hose 16 is flexible and shortens as the vacuum therein is increased.

As the vertical portion of the overhead hose 16 shortens, the object 12 is lifted off the ground 34. An operator 36 may adjust the height of the object with the control lever 32 that regulates the vacuum in the overhead hose 16 and the length thereof by allowing air to enter through valves (not shown) connected to the outside. After the object 12 is positioned at the desired height, the operator 36 moves the vacuum lifter 10 and the attached object 12 by pushing or pulling with the handles 28 or by pushing or pulling on the object 12 itself.

Figure 2B:
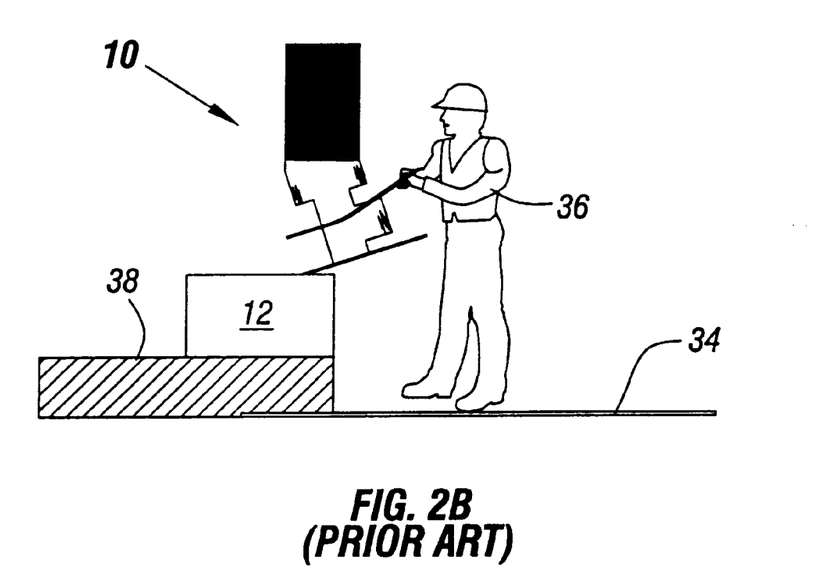

FIG. 2B illustrates the removal of the vacuum lifter 10 from the object 12 after the object 12 is positioned on the desired surface 38. The operator 36 allows air to enter the secondary hoses 20 to release the vacuum between the sealing plates 24 and the surface 14. The object 12 is consequently released from the vacuum lifter 10. After the vacuum is released, the operator 14 attempts to slide the vacuum lifter 10 off without disturbing the positioning of the object 12.

Since the vacuum lifter 10 is heavy, the operator 36 may have difficulty in sliding the lifter 10 both on and off the object 12 to be lifted. Sliding the vacuum lifter 10 on or off is specially difficult when the object 12 has been placed on a surface above the shoulders of the operator 36. Since the vacuum lifter 10 cannot be easily slid on or off objects 12 positioned at shoulder height, the lifter 10 is less useful as a warehouse tool.

Some vacuum lifters 10 allow reversing the air flow in the secondary hoses 20. After the air flow is reversed, the lifter 10 rests on a cushion of air between the sealing plates 24 and the surface 14 of the object 12. The cushion of air facilitates sliding the vacuum lifter 10 on or off the object 12. Unfortunately, reversing the air flow in the vacuum lifter 10 requires relatively substantial time because the overhead hose 16 is wide and must generally be refilled with air. For such prior art lifters 10, the operator 36 may have to wait thirty seconds for the vacuum pump to form a sufficient air cushion. In some other lifters 10, a reversal of the airflow is inconvenient because reversing the airflow eliminates the lifting force exerted by the overhead hose 16. These construction and time delay constraints compromise the usefulness of reversal of the internal airflow as an aid to sliding the lifter 10 on or off an object.

The present invention is directed to overcoming, or at least reducing the effects of, one or more of the problems set forth above.

SUMMARY OF THE INVENTION

The present invention, in one embodiment, is a vacuum lifter. The vacuum lifter includes an overhead hose, a housing, and a roller rotatably fixed to the housing. The housing is adapted to roll on the roller.

BRIEF DESCRIPTION OF THE DRAWINGS

FIG. 10 is a cross section of a plate in accordance with one embodiment of the present invention While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would nevertheless be a routine undertaking for those of ordinary skill in the art having the benefit of this disclosure.

A First Embodiment of the Invention

Figure 3:
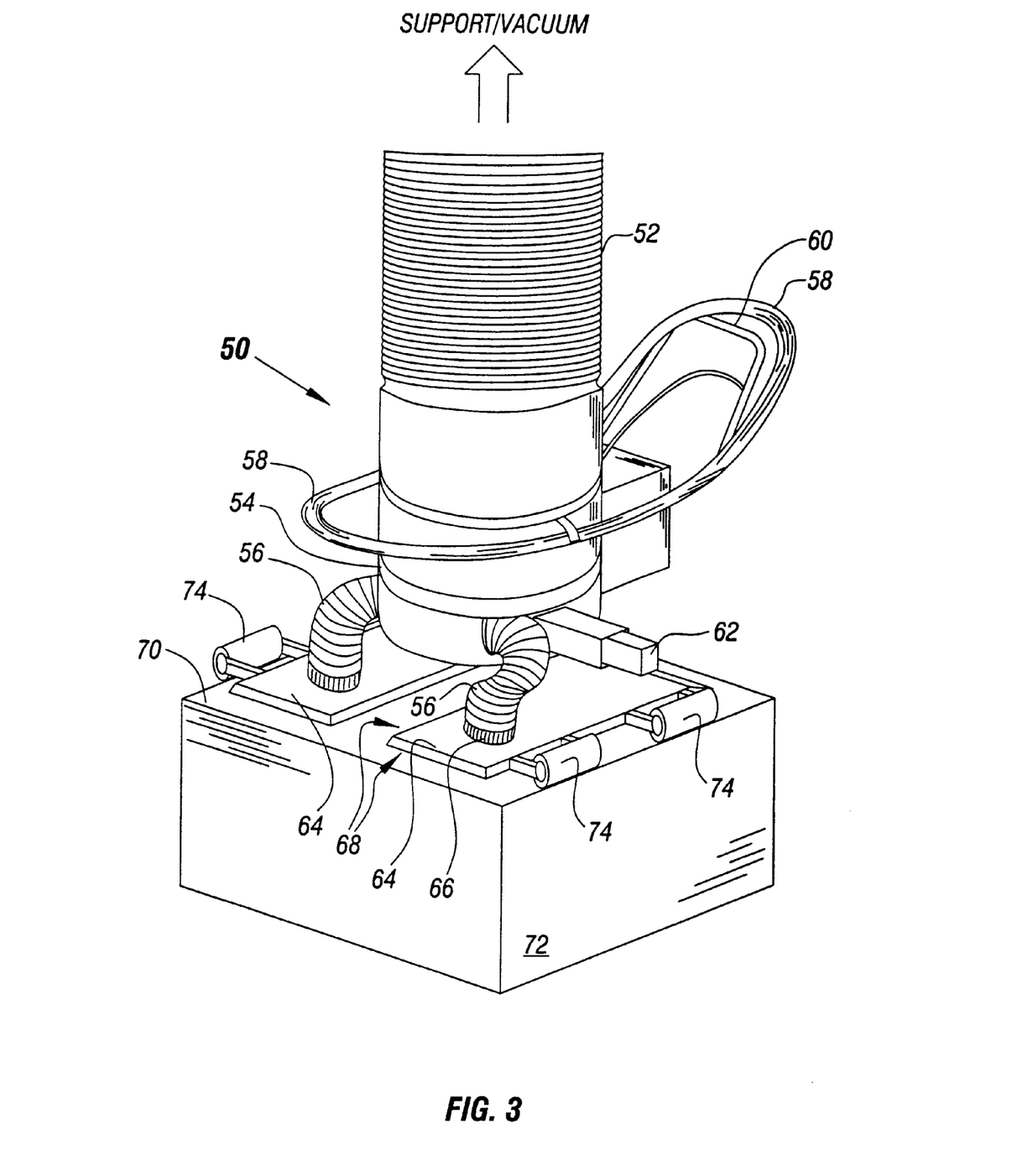
FIG. 3 illustrates a first embodiment for an improved vacuum lifter constructed in accordance with the present invention.

FIG. 3 illustrates a first embodiment 50 for an improved vacuum lifter constructed in accordance with the present invention. The vacuum lifter 50 has an overhead hose 52 with a substantially vertical portion, a housing 54, secondary hoses 56, handles 58, control levers 60, and a structure 62 for rigidly or rotatably affixing one or more sealing plates 64 to the housing 54. Each sealing plate 64 has a pliable sealing ring 66 encircling the edges 68 of the lower surface thereof. The sealing rings 66 hermetically seal the sealing plates 64 to a portion of a surface 70 of the object 72 when compressed.

Figure 10:
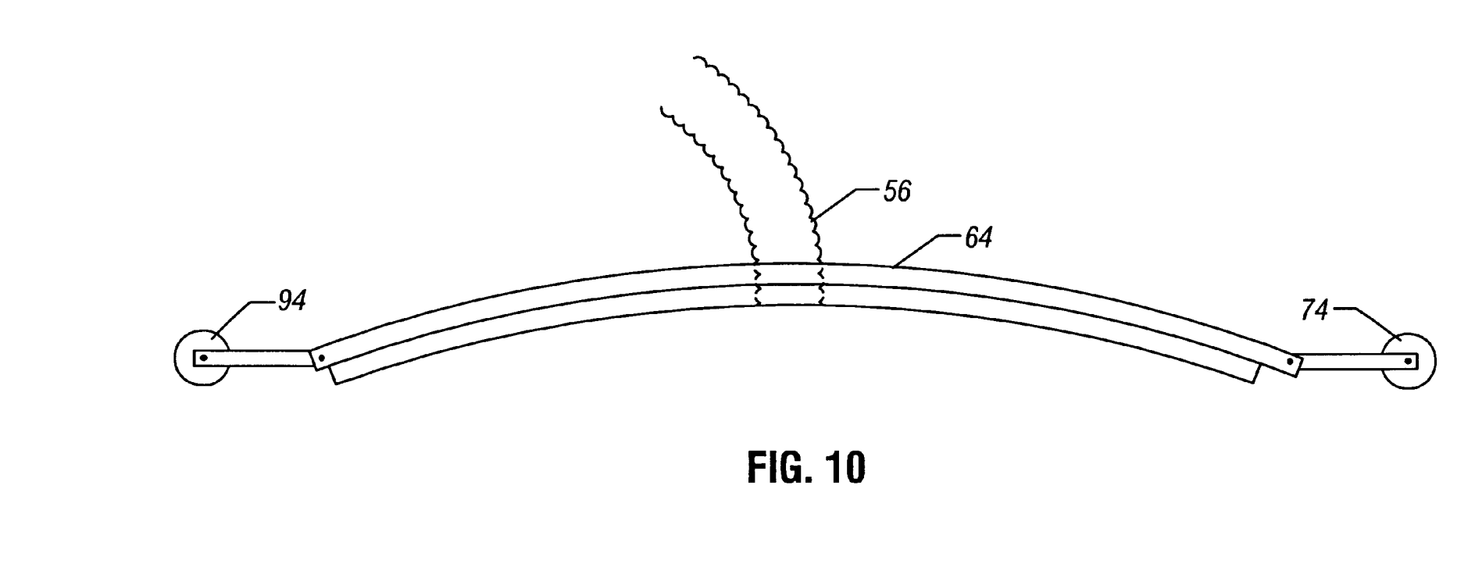

The overhead hose 52, housing 54, secondary hoses 56, sealing plates 64, and sealing rings 66 form a hermetic conduit between the intake of a vacuum pump (not shown) and portions of the surface 70 of the object 72 to be lifted. When a vacuum is formed in the conduit, a suction grips the object 72 to the sealing plates 64 of the lifter 50. For the surface 70 having flat and cylindrical shapes the sealing plates 64 may have flat and partially cylindrical cross sections, respectively, to improve the seal with the surface 70. FIG. 10 shows a sealing plate 64 with a partially cylindrical cross section.

In FIG. 3, the vacuum lifter 50 includes one or more rollers 74. The rollers 74 are rotatably connected to the sealing plates 64 as discussed more fully below relative to FIGS. 4 and 5A–5C. The vacuum lifter 50 may be supported with only the rollers in contact with the surface 70 as discussed more fully below relative to FIGS. 4, 9A–9B, and 5C. If no suction is applied between the surface 70 and the sealing plates 64, the rollers 74 enable displacing the vacuum lifter 50 on the surface 70.

Figure 4:
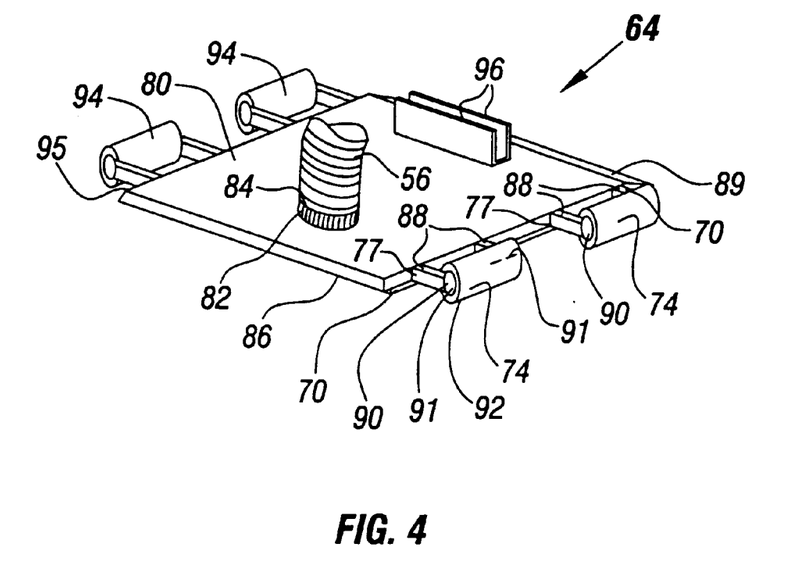
FIG. 4 illustrates an embodiment for an improved sealing plate for use in the vacuum lifter of FIG. 3.

FIG. 4 shows a top surface 80 in one embodiment of the sealing plate 64 in the vacuum lifter 50 of FIG. 3. The secondary hose 56 connects to a fitting 82 that hermetically seals the joint between the secondary hose 56 and the sealing plate 64. A hole 84 pierces the sealing plate 64 connecting the top surface 80 and the lower surface 86 thereof. The sealing ring 66 runs along all of the perimeter of the lower surface 86 of the sealing plate 64. First ends 77 of a plurality of pairs of arms 88 rigidly connect to a first edge 89 of the sealing plate 64. Second ends 90 of each pair of arms 88 connect to opposite ends 91 of an axis 92 running along the center of each roller 74. In some embodiments, a second set of rollers 94 connects to an opposite edge 95 of the sealing plate 64. In other embodiments, a second set of rollers may connect to an adjacent edge or even to all edges of the sealing plate (not shown). One or more structures 96 project from the top surface 80 of the sealing plate 64 to enable rigid connections with the housing 54 of the vacuum lifter 50 as shown in FIG. 3.

Figure 5A:
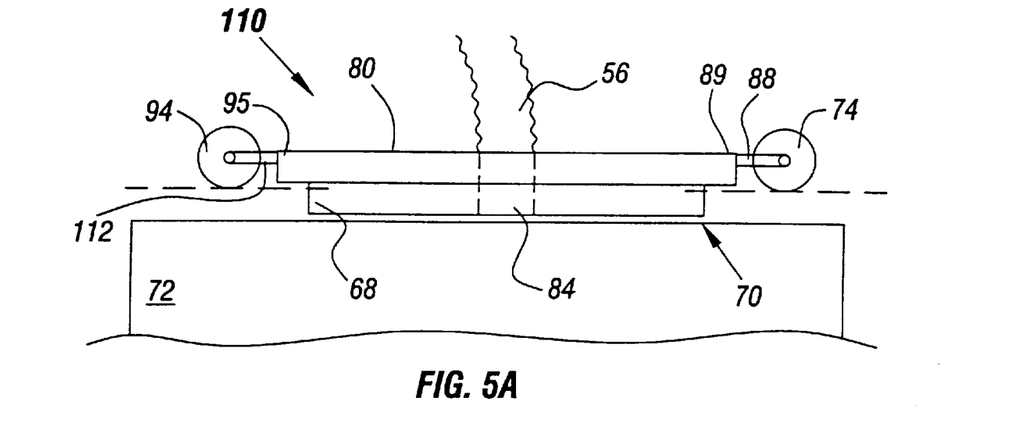
FIGS. 5A–5C are side views of several alternative embodiments for an improved sealing plate as may be employed in the vacuum lifter of FIG. 3.

FIG. 5A is a side view of a first embodiment for the sealing plate 64 of FIG. 3 as previously illustrated in FIG. 4. The two sets of rollers 74 and 94 are attached to opposite edges 89 and 95 of the sealing plate 110 by rigid arms 88 and 112. The diameter of the rollers 74 and 94 is small enough to not interfere with the sealing ring 66 forming a hermetic seal with the surface 70 of the object 72 to be lifted, i.e. the rollers 74 and 94 do not touch the surface 70 when the sealing ring 66 is compressed.

Figure 5B:
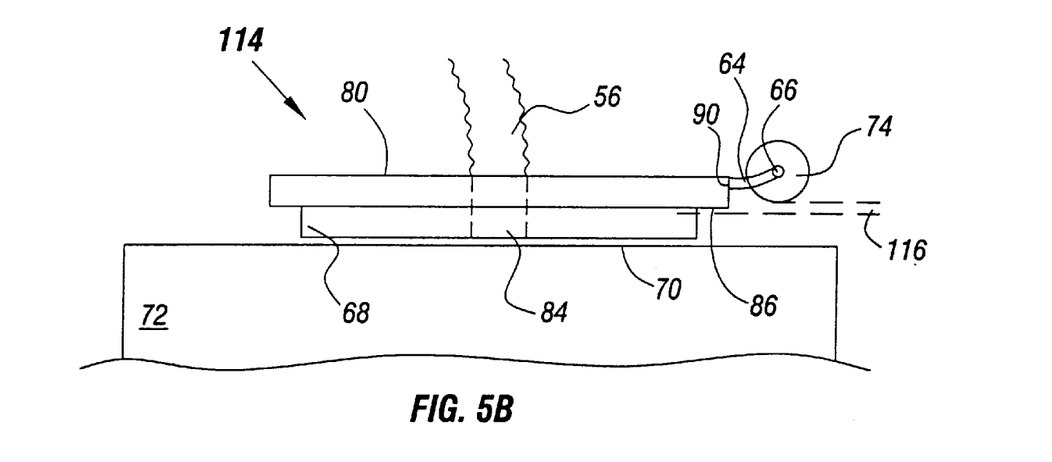

FIG. 5B illustrates a second embodiment 114 for the sealing plate 64 in FIG. 3 in which the arms 88 rigidly attach to the edge 89 of the sealing plate 64. The rigid arms 90 are slightly upturned to enhance the clearance 116 between the roller 74 and the lower surface 86 of the sealing plate 64. The clearance 116 further ensures the roller 74 does not impede the formation of the hermetic seal between the sealing plate 114 and the surface 70 of the object 72 to be lifted.

Figure 5C:
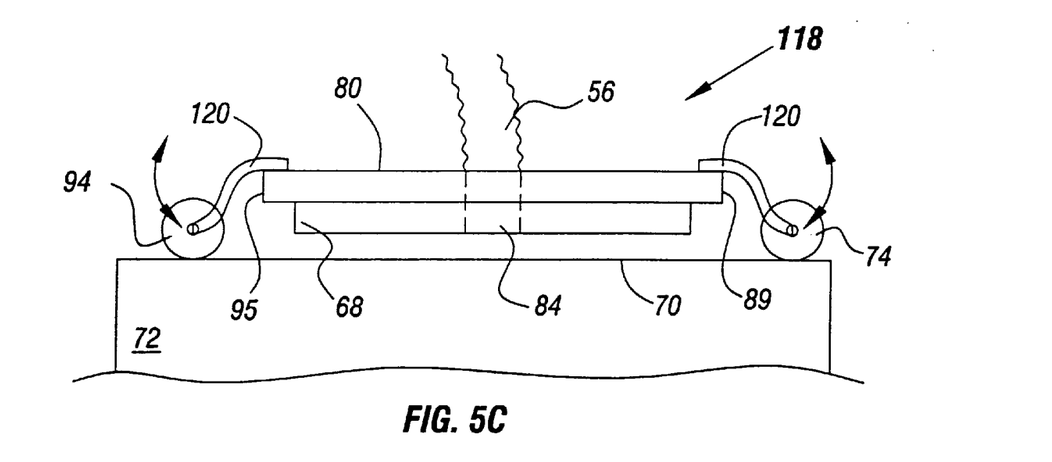

FIG. 5C illustrates a third embodiment for the sealing plate 64 in FIG. 3 in which flexible arms 120 connect the rollers 74 and 94 to the sealing plate 118. When no vacuum is applied the sealing plate 118 rests above the surface 70 supported only by the rollers 74 and 94. When a vacuum is applied to the interior of the flexible arms 120, the pressure difference between the regions between the top and lower surfaces of the sealing plate 64 pushes sealing plate toward the surface 70. Under this vacuum generated force, the arms 120 bend allowing the sealing plates 64 to descend and allowing the sealing ring 66 to form a tight contact with the surface 70. The flexible arms 120 extend the rollers 74 and 94 to a position below the sealing ring 66 in response to the vacuum being released. Releasing the vacuum causes the sealing plate 118 to pop up and rest with only the rollers 74 and 94 making contact with the surface 70.

A Second Embodiment of the Invention

Figure 6:
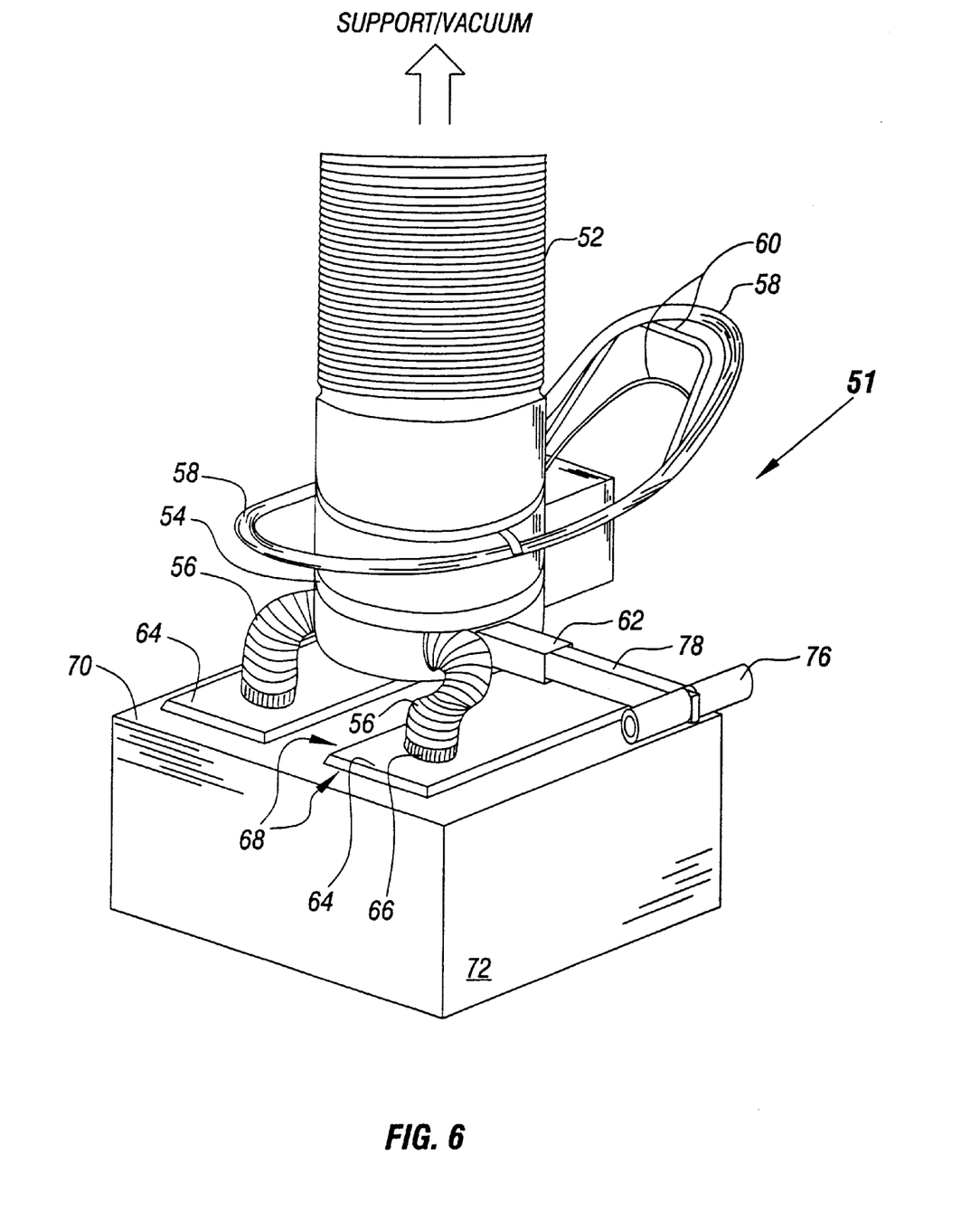
FIG. 6 illustrates a second embodiment for an improved vacuum lifter constructed in accordance with the present invention.

FIG. 6 illustrates a second embodiment 51 for an improved vacuum lifter constructed in accordance with the invention. The vacuum lifter 51 has many parts similar to those of the vacuum lifter 50 in FIG. 3, with like parts bearing like numbers. More particularly, the vacuum lifter 51 has an overhead hose 52 with a substantially vertical portion, a housing 54, secondary hoses 56, handles 58, control levers 60, and a structure 62 for rigidly or rotatably affixing one or more sealing plates 64 to the housing 54. Each sealing plate 64 has a pliable sealing ring 66 encircling the edges 68 of the lower surface thereof. The sealing rings 66 hermetically seal the sealing plates 64 to a portion of a surface 70 of the object 72 when compressed.

The overhead hose 52, housing 54, secondary hoses 56, sealing plates 64, and sealing rings 66 form a hermetic conduit between the intake of a vacuum pump (not shown) and portions of the surface 70 of the object 72 to be lifted. When a vacuum is formed in the conduit, a suction grips the object 72 to the sealing plates 64 of the lifter 51. For the surface 70 having flat and cylindrical shapes, the sealing plates 64 may have flat and partially cylindrical cross sections, respectively, to improve the seal with the surface 70.

In FIG. 6, the vacuum lifter 51 has one or more rollers 76 rotatably connected to the sealing plates 64 as discussed more fully below relative to FIG. 7. The rollers 76 are rotatably connected to an arm 78 rigidly connected to the structure 62 or to the housing 54. The vacuum lifter 51 must be tilted by more than a preselected angle with respect to the general axis of the substantially vertical portion of the overhead hose 52 before being supported on the surface 70 by the rollers 76. If no suction is applied between the surface 70 and the sealing plates 64, the rollers 76 enable displacing the vacuum lifter 51 on the surface 70.

Figure 7:
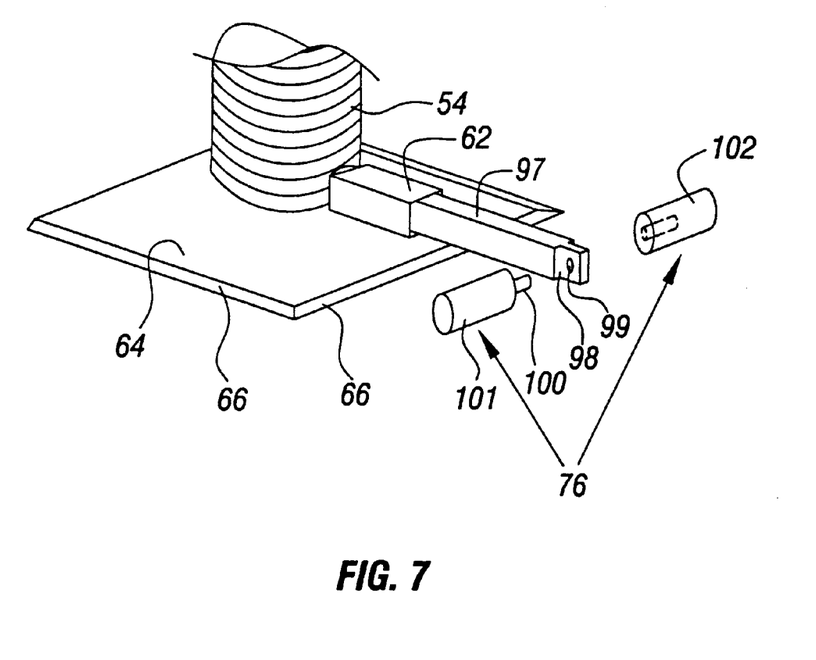
FIG. 7 illustrates an embodiment for the roller of the vacuum lifter of FIG. 6.

FIG. 7 illustrates one embodiment of the roller 76 for the vacuum lifter 51 of FIG. 6. A rigid arm 97 is rigidly connected to the structure 62 affixed to the housing 54. The distal end 98 of the arm 97 is tapered and perforated by a horizontal hole 99. The hole 99 forms a joint with an axle 100 allowing rotational movement by the roller 76. The roller 76 has a male and female parts 101 and 102 that are rigidly connected by a distal portion of the axle 100 inserted into the female part 102 of the roller 76. In other embodiments, a second roller (not shown) may connect to the opposite side of the structure 62.

A Method for Operating the Vacuum Lifter

Figure 8:
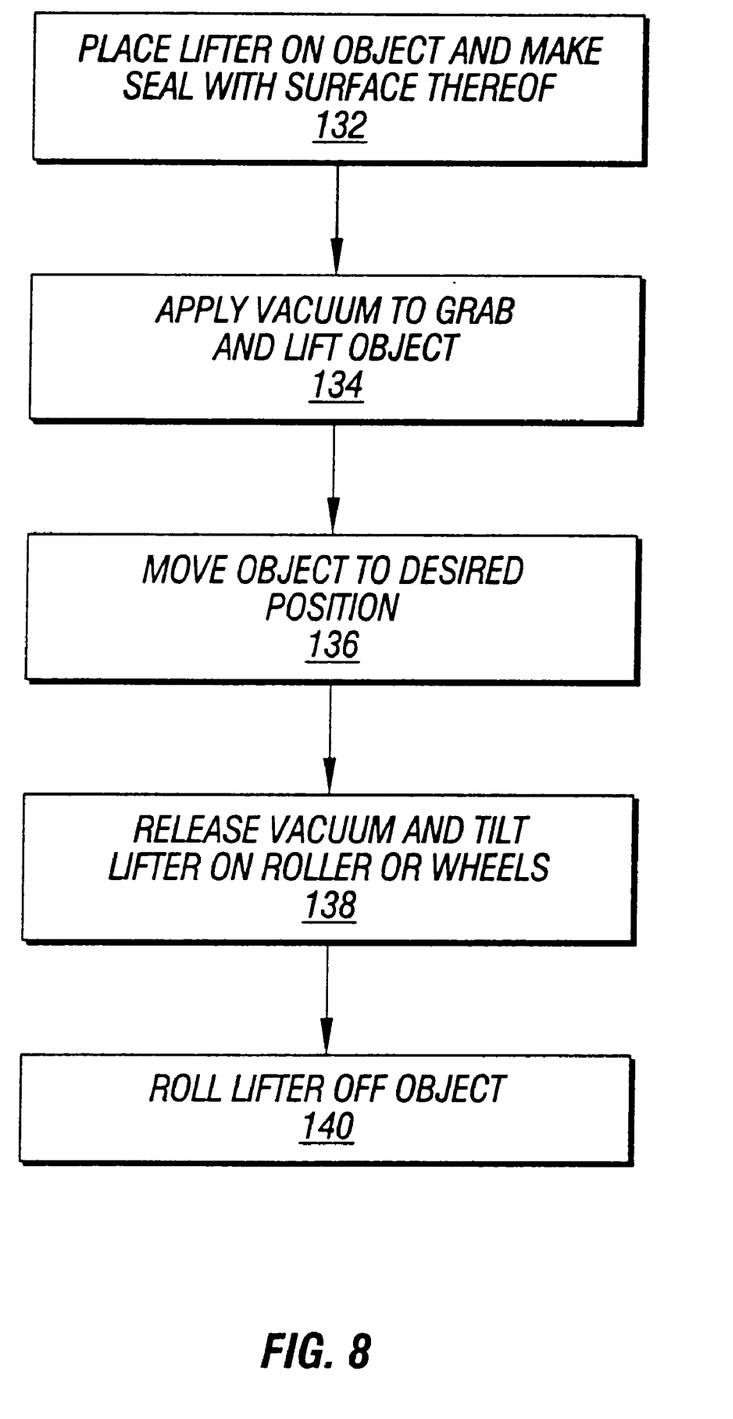
FIG. 8 is a flowchart illustrating one embodiment of a method for using the vacuum lifters of FIGS. 3 and 6.

FIG. 8 is a flowchart illustrating a method 130 for operating the vacuum lifters 50 and 51 of FIGS. 3 and 6, respectively in accord with one embodiment of the invention. At block 132, the lifter 50 or 51 is positioned on the surface 70 of the object 72 to be lifted. The operator, ordinarily a human operator, positions the lifter 50 or 51 on the surface 70 so that the sealing rings 66 can form a hermetic seal with the surface 70. At block 134, the operator adjusts the control levers 60 to apply a vacuum between the sealing plates 64 and the surface 70 so that the lifter 50 or 51 grabs the object 72. In some embodiments, the weight of the lifter 50 compresses the sealing rings 66 to form the airtight seals with the surface 70. In other embodiments, flexible arms, e.g., the flexible arms 120 in FIG. 5C, bend under a force applied by either the operator or the vacuum causing the rollers 74 and 94 to move out of the way. Subsequently, the sealing ring 66 makes an airtight seal with the surface 70. At block 136, the operator, ordinarily a human operator, moves the lifter 50 or 51 and the attached object 72 to the desired resting position.

At block 138, the operator uses the control levers 60 to release the vacuum holding the object 72. In the embodiment of FIG. 6 or FIG. 3 and 5B, the operator subsequently tilts the lifter 51 or 50 by at least a preselected angle so that the lifter 51 or 50 rests on the rollers 76 or 74. The operator supports the other side of the lifter 51 or 50 himself by using the handles 58. Preferably, the vertical portion of the overhead hose 52 is sufficiently flexible to enable tilting the lifter 50 onto and off the rollers 74. In the embodiment of FIGS. 3 and 5C, the lifter 50 automatically pops above the surface 70 and rests on the rollers 74 as soon as the vacuum pressure below the sealing plates 64 is released. At block 140, the vacuum lifter 50 or 51 is rolled off the object 72 on the rollers 74 or 76, ordinarily by a human operator.

Figure 9A:
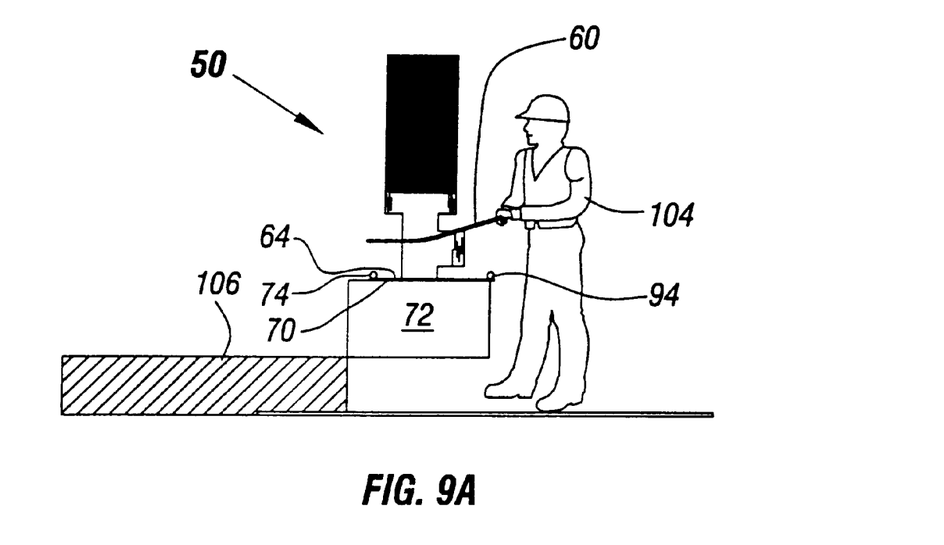
FIGS. 9A–9B illustrate the operation of the vacuum lifter of FIG. 3.
Figure 9B:
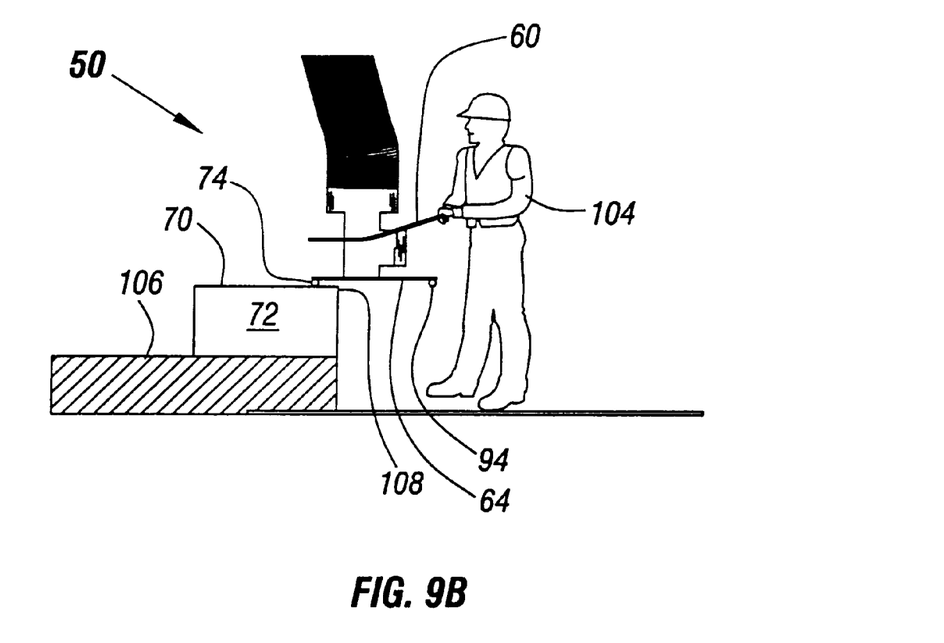

FIGS. 9A–9B more particularly illustrate the operation of the improved vacuum lifter 50 of FIG. 3 using the method of FIG. 8. The operator 104 positions the vacuum lifter 50 on the object 72, by lowering the lifter 50 onto the surface 70 and then using the rollers 74 to move the lifter 50 so that the sealing plates 64 can properly seal. Then, the operator 104 pushes the sealing plates 64 against the surface 70. In some embodiments, the weight of the lifter 50 is sufficient to push the sealing plates 64 against the surface 70. Then, the operator 104 applies a vacuum to the surface 70. Since the rollers 74 do not impede the formation of a clean contact between the sealing ring 66 and the surface 70, the vacuum forms a strong grip on the object 72. After the vacuum has formed a grip on the object 72, the operator 104 may displace, lift, and lower the object 72 with the vacuum lifter 50.

FIG. 9B illustrates the removal of the vacuum lifter 50 from the object 72 after having been positioned on a desired resting surface 106. The operator 104 uses the control lever 60 to release the vacuum between the sealing plate 64 and the surface 70 of the object 72. After the vacuum suction has been released, the operator uses the rollers 74 and 94 to roll the lifter 50 to an edge 108 of the surface 70. The rollers 74 and 94 allow the removal to proceed with less need to slide the heavy and bulky lifter 50 along the surface 70.

Remarks

The particular embodiments disclosed above are illustrative only, as the invention may be modified and practiced in different but equivalent manners apparent to those skilled in the art having the benefit of the teachings herein. For instance, the method of FIG. 8 might, in some embodiments, be performed robotically. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A vacuum lifter, comprising:
  a) an overhead hose;
  b) a housing;
  c) at least one sealing plate; and
  d) at least one flexible arm having a first and a second end, the first end attaching to an edge of the sealing plate, with a roller rotatably attached to the second end, the flexible arm being adapted to extending the roller connected thereto to a position adapted to supporting the vacuum cleaner.

2. The vacuum lifter as set forth in claim 1, further comprising:
  a flexible sealing ring located on a distal surface of each sealing plate.

3. The vacuum lifter as set forth in claim 2, wherein the sealing plate has a partially cylindrical cross section.

4. The vacuum lifter as set forth in claim 1, wherein the vacuum lifter is adapted to rest and roll on the roller in response to the vacuum holding an object being released.

5. A vacuum lifter, comprising:
  a) an overhead hose;
  b) a housing;
  c) at least one sealing plate rigidly attached to the housing;
  d) a flexible sealing ring located on a distal surface of each sealing plate;
  e) a rigid arm, the arm having a first end attached to an edge of the housing and having a second end;
  f) a roller rotatably attached to the second end of the arm, wherein a distal extension of the sealing ring lies in a plane having a preselected clearance from the roller.

6. The vacuum lifter as set forth in claim 5, further comprising a second roller fixed to the housing, the vacuum lifter being adapted to roll on the two rollers.

7. A vacuum lifter, comprising:
  a least one sealing plate having first and second surfaces and having a hole connecting the first surface to the second surface;

at least two arms having first and second ends, the first ends being connected to the sealing plate, the arms projecting substantially perpendicular to an edge of the sealing plate and substantially in the plane thereof; and at least one roller being rotatably held between the second ends of the two arms and having an axis of rotation substantially parallel to a line between said second ends.

8. The vacuum lifter as set forth in claim 7, further comprising a flexible sealing ring having proximate and distal surfaces, the distal surface being located on the second surface of the sealing plate.

9. The vacuum lifter as set forth in claim 8, wherein a portion of the roller extends between the second surface of the sealing plate and the distal surface of the sealing ring.

10. The vacuum lifter as set forth in claim 7, wherein the roller has a preselected clearance with the second surface of the sealing plate.

11. The vacuum lifter as set forth in claim 7, wherein the arms are flexible and adapted to extending the roller more distal to the second surface of the sealing plate than the sealing ring.

12. The vacuum lifter as set forth in claim 7, wherein the second surface of the sealing plate is substantially flat.

13. The vacuum lifter as set forth in claim 7, further comprising:

at least two additional arms having third and fourth ends, and projecting substantially perpendicular to a second edge of sealing plate and substantially in the plane of the sealing plate, the third ends being connected to the sealing plate; and at least one additional roller being rotatably held between the fourth ends of the two additional arms and having an axis of rotation substantially parallel to a line drawn between said fourth ends.

14. The vacuum lifter as set forth in claim 13, wherein the axis of rotation of the additional roller is substantially parallel to the axis of rotation of the at least one roller.

15. A vacuum lifter as set forth in claim 7, further comprising:

a housing having at least one airtight passage between a first and a second port thereof.

16. The vacuum lifter as set forth in claim 15, further comprising:

a) an overhead hose having first and second ends, the first end being hermetically attached to the first port; and b) at least one secondary hose having third and fourth ends, the third end connecting to the second port and the fourth end connecting to an edge of the hole, the edge being located on the first surface of the sealing plate, the secondary hose for completing an airtight conduit between a second surface of the sealing plate and the second end of the overhead hose.

17. The vacuum lifter as set forth in claim 16, further comprising a) a second sealing plate rigidly attached to the housing and having a hole between third and fourth surfaces thereof; and b) a second secondary hose having fifth and sixth ends, the fifth end connecting to the second port and the sixth end connecting to the edge of the hole along the third surface of the second sealing plate, the second secondary hose for completing an airtight conduit between the fourth surface of the second sealing plate and the second end of the overhead hose said conduit also open to the first secondary hose.

18. The vacuum lifter as set forth in claim 7, further comprising a sealing ring attached to the second surface of the sealing plate, the sealing ring adapted to form an airtight seal between the second surface of the sealing plate and the surface of the object responsive to being compressed therebetween.

19. The vacuum lifter as set forth in claim 7, wherein the second surface of the sealing plate has a partially cylindrical cross section.

20. A vacuum lifter adapted to lifting an object, comprising:

a) a housing having at least one airtight passage between a first and a second port thereof;

b) at least one sealing plate rigidly attached to the housing and having a hole between first and second surfaces thereof; and c) at least one roller rotatably attached to the vacuum lifter; wherein the roller rotatably attaches to an edge of the sealing plate.

21. The vacuum lifter as set forth in claim 20, further comprising:

an overhead hose having first and second ends, the first end being hermetically attached to the first port; and at least one secondary hose having third and fourth ends, the third end connecting to the second port and the fourth end connecting to an edge of the hole, the edge being located on the first surface of the sealing plate, the secondary hose for completing an airtight conduit between a second surface of the sealing plate and the second end of the overhead hose.

22. The vacuum lifter as set forth in claim 20, further comprising a sealing ring attached to the second surface of the sealing plate, the sealing ring adapted to form an airtight seal between the second surface of the sealing plate and the surface of the object responsive to being compressed therebetween.

* * * * *